United States Patent

Mikami et al.

[11] Patent Number: 5,962,552
[45] Date of Patent: Oct. 5, 1999

[54] INK COMPOSITION AND IMAGE RECORDING METHOD

[75] Inventors: Takeshi Mikami; Yuzuru Fukuda, both of Minami-Ashigara, Japan

[73] Assignee: Fuji Xerox Co., Ltd., Tokyo, Japan

[21] Appl. No.: 08/803,749

[22] Filed: Feb. 21, 1997

[30] Foreign Application Priority Data

Feb. 29, 1996 [JP] Japan ................................ 8-043328

[51] Int. Cl.$^6$ ............................. C09D 11/10; C08K 5/54
[52] U.S. Cl. ................................. 523/161; 260/DIG. 38; 106/31.13; 106/31.27; 106/31.6; 347/54; 524/261; 524/264
[58] Field of Search .................... 523/161; 260/DIG. 38; 106/31.13, 31.27, 31.6; 347/54; 524/261, 264

[56] References Cited

U.S. PATENT DOCUMENTS

| | | | |
|---|---|---|---|
| 3,886,865 | 6/1975 | Ohto et al. | 101/456 |
| 4,728,709 | 3/1988 | Klemarczyk et al. | 528/15 |
| 5,686,523 | 11/1997 | Chen et al. | 524/547 |

FOREIGN PATENT DOCUMENTS

| | | |
|---|---|---|
| B2-60-32663 | 7/1985 | Japan . |
| A-5-239392 | 9/1993 | Japan . |
| A-5-255567 | 10/1993 | Japan . |
| A-5-255628 | 10/1993 | Japan . |
| A-6-340835 | 12/1994 | Japan . |
| A-7-47355 | 5/1995 | Japan . |

OTHER PUBLICATIONS

The Printing Ink Manual, 5 Ed., 1993, p. 459, lines 1–5, silicone resin.

*Primary Examiner*—Marion McCamish
*Assistant Examiner*—John J. Guarrriello
*Attorney, Agent, or Firm*—Oliff & Berridge, PLC

[57] ABSTRACT

Described are an ink composition comprising water, a colorant and acrylic silicone resin particles having alkoxysilyl groups; and an image recording method comprising discharging the droplet of an ink composition from a recording head to record an image on a substrate, wherein an ink composition comprising water, a colorant and acrylic silicone resin particles having alkoxysilyl groups is used as the ink composition. According to the present invention, 1) blotting of the ink composition on the substrate can be prevented, 2) an image which has water resistance and has a markedly high image density can be obtained, 3) an image does not become sticky even under a high environmental temperature, and 4) there is no problem in safety.

22 Claims, No Drawings

INK COMPOSITION AND IMAGE RECORDING METHOD

BACKGROUND OF THE INVENTION

1. Field of the Invention

This invention relates to an ink composition and an image recording method. More specifically, this invention pertains to an ink composition particularly suited for an ink jet printer and to an image recording method using the composition.

2. Description of the Related Art

Recently, ink jet printers, which have a low running cost and can easily provide high resolution images and color images, have come to be used as output devices for information processing equipment such as computers. As an ink composition for an ink jet printer, an aqueous solution of a dye has been used mainly to date. However, in the aqueous solution of a dye, when ink discharged from a nozzle is deposited on recording paper, the ink blots on the recording paper and a dot is larger than the ink droplet discharged and the density of the image recorded becomes low. In addition, it has the problem that the recorded image is less waterproof.

With a view to overcoming these problems of the aqueous ink for ink jet system, [A] proposed are ink compositions to which resin particles for forming a film are added [JP-B No. 60-32663 (addition of a latex), JP-A No. 5-239392 (addition of a resin containing a carboxyl group and a nonionic hydrophilic group and dispersible in water), JP-A No. 5-255628 (addition of an non-crosslinked vinyl polymer) and JP-A No. 6-340835 (addition of polyester particles containing an ionic group)]; and an ink composition to which colored resin particles capable of forming a film are added [JP-A No. 5-255567]. [B] Also proposed is an ink composition to which resin particles (polyester particles or the like) and a crosslinking agent are added respectively so as to obtain an image film composed of crosslinked resin [JP-B No. 7-47355].

The ink compositions described above [A] can not prevent the ink blotting due to the capillary phenomenon of the fiber of the recording paper completely. The ink compositions described above [A] can not also prevent the penetration of the ink into the recording paper and then improvement of the image density is limited. Moreover, the above-described ink compositions [A] to which particles capable of forming a film at normal temperature are added have the common problem that the image recorded on the substrate becomes sticky when the ambient temperature around the printed sample becomes high. The reason why the image becomes sticky when the ambient temperature is high is that resin particles whose glass transition temperature is lower than normal temperature must be used so that the resin particles can coalesce at the temperature equal to or lower than the normal temperature so as to form a film. The image becoming sticky is remarkable at particularly high environmental temperatures.

In the above-described ink composition [B], the image recorded does not become sticky because the image film has been crosslinked. However, the crosslinking agent added to the ink composition is a reactive substance, thereby the ink composition has problems concerning safety and stability.

The present invention has been completed to dissolve the problems described above. An object of the present invention is to provide an ink composition which can prevent the ink blotting on the recording paper and can provide an image having markedly high density and water resistance, particularly to provide an ink composition suited for use in an ink jet printer.

Another object of the present invention is to provide an ink composition which does not become sticky after forming an image even at a high environmental temperature and involves no problem even in safety and stability.

A further object of the present invention is to provide an image recording method using such an ink composition.

SUMMARY OF THE INVENTION

In a first aspect of the present invention which can attain the above-described objects, there is thus provided an ink composition, which comprises water, a colorant and acrylic silicone resin particles having alkoxysilyl groups.

In a second aspect of the present invention, there is also provided an image recording method comprising discharging an ink droplet from a head to record an image on a substrate, wherein the above-described ink composition is used.

According to the present invention, just after the ink is deposited on the recording paper, water evaporates or penetrates into the recording paper and then acrylic silicone resin particles included in the ink composition begin coalescing so that the alkoxysilyl groups in the particles are disposed outside of the coalescent. The alkoxysilyl groups hydrolyze under the influence of the remaining water, become reactive and start dehydration condensation. The condensation proceeds at a markedly high velocity and a firm siloxane-crosslinked film containing the colorant therein is formed. Thereby, it is possible to prevent the ink blotting and to form a water-resistant and high-density image on a substrate such as recording paper.

As described above, the ink composition according to the present invention is crosslinked on being deposited on the substrate, so that the image formed by the ink composition does not become sticky even at high temperature. In addition, the crosslinking proceeds by itself without the addition of a crosslinking agent, so that the ink composition is free from a problem with respect to safety.

DETAILED DESCRIPTION OF THE PREFERRED EMBODIMENTS

The ink composition according to the present invention contains water, a colorant and resin particles. The resin particles are acrylic silicone resin particles containing alkoxysilyl groups. More specifically, the resin is a self crosslinking type resin having as a main chain an acrylic polymer and as side chains alkoxysilyl groups.

Such acrylic silicone resin particles are typically prepared by the emulsion polymerization of an alkoxysilyl-containing acrylic monomer, which has been obtained by introducing an alkoxysilyl group into an acrylic monomer, or prepared by the emulsion polymerization of an alkoxysilyl-containing acrylic monomer and an alkoxysilyl-free acrylic monomer.

The alkyl group of an alkoxysilyl group preferably has 1–3 carbon atoms, because an alkyl group having 4 or more carbon atoms is apt to lower the self crosslinking rate of the resin. Such an alkoxysilyl group is represented by the following formula

wherein R represents a $C_{1-3}$ alkyl group. The alkyl group has more preferably 1–2 carbon atoms.

Examples of the acrylic monomer prior to the introduction of an alkoxysilyl group include methyl methacrylate, ethyl methacrylate, n-butyl methacrylate, isobutyl methacrylate, 2-ethylhexyl methacrylate, acrylonitrile, methyl acrylate, ethyl acrylate, n-butyl acrylate, 2-ethylhexyl acrylate, methacrylic acid, acrylic acid, 2-hydroxyethyl methacrylate, hydroxypropyl methacrylate, 2-hydroxyethyl acrylate, acrylamide, N-methylol acrylamide and glycidyl methacrylate.

The monomers obtained by introducing the above-described alkoxysilyl group into the above-described acrylic monomer can be used either singly or in combination.

As examples of the alkoxysilyl-free acrylic monomer, those exemplified above as acrylic monomers prior to the introduction of the alkoxysilyl group can be used.

In the acrylic silicone resin particles, the ratio of the total moles of the alkoxysilyl group to the total moles of the acrylic monomer (total moles of an alkoxysilyl group : total moles of the acrylic monomer) is preferably from 0.01 to 1.0, more preferably from 0.1 to 1.0.

Such alkoxysilyl-containing and alkoxysilyl-free acrylic monomers may be copolymerized with a copolymerizable monomer other than the acrylic monomer, such as styrene, vinyl toluene or vinyl acetate.

The weight-average molecular weight of the acrylic silicone resin is generally from 2,000 to 100,000. Within this range, a crosslinked film of the acrylic silicone resin can be formed preferably. When the weight-average molecular weight is below 2,000, the formed film is less flexible and can not be fixed to the paper very strongly. When weight-average molecular weight of the acrylic silicone resin exceeds 100,000, the coalescence of the resin particles is apt to be hindered, which results in a deterioration of the film forming ability of the resin particles. Weight-average molecular weight ranges from 3,000 to 20,000 preferably.

Preferably, each acrylic silicone resin particle is dispersed in the ink composition. From the viewpoints of ease of preparation and smoothness of emission from a nozzle of an ink jet printer, the average particle size of the resin particles is preferably from 0.01 micron to 3 micron, and is more preferably from 0.05 micron to 1 micron.

In the ink composition according to the present invention, the acrylic silicone resin particles are generally added in an amount of 1–50 wt. % on the basis of the entire amount of the ink composition. Outside the above range, it is difficult to crosslink the resin particles and the ink composition are apt to clog up the nozzle of the ink jet printer. More specifically, when the amount of the acrylic silicone resin particles is smaller than 1 wt. % on the basis of the entire amount of the ink composition, it takes much time to dry the ink deposited on the recording paper at normal temperature, a dot tends to widen on the surface of the recording paper, and the ink composition tends to penetrate into the recording paper, which results in resin particles contacting each other less frequently. As a result, the self-crosslinking capability of the resin particles tend to lower. When amount of the acrylic silicone resin particles exceeds 50 wt. % on the basis of the entire amount of the ink composition, the viscosity of the ink composition increases considerably, thereby it is difficult to discharge it from the nozzle of an ink jet printer. Therefore, the amount of the particles is preferably from 5 wt. % to 35 wt. %.

Any colorant can be used in the ink composition according to the present invention insofar as it has sufficient affinity with water to be dispersed in water uniformly when used in combination with a dispersant or the like. Representative examples include pigment, water-soluble dye and disperse dye.

Examples of the pigment include organic pigments and inorganic pigments. Examples of pigments for monochromic printing include such organic pigments as furnace black, channel black (carbon black (C. I. pigment black 7), aniline black (C. I. pigment black 1) and the like. Examples of the pigment for color printing include C. I. pigment yellow 1, 3, 12, 13, 14, 17, 24, 34, 35, 37, 42, 53, 55, 81, 83, 95, 97, 98, 100, 101, 104, 108, 109, 110, 117, 120, 138 and 153; C. I. pigment violet 1, 3, 5:1, 16, 19, 23 and 38; C. I. pigment blue 1, 2, 15, 15:1, 15:2, 15:3, 15:4, 15:6 and 16 and the like. The pigment is added in an effective amount, preferably in an amount of 1–30 wt. %, and particularly preferably 1.5–12 wt. % on the basis of the entire amount of the ink composition. The ink composition of the present invention may contain an optional dipersant in an amount of 0.01 to 1 parts by weight on the basis of 100 parts by weight of the pigment for the purpose of dispersing the pigment in water uniformly. Furthermore, it is desirable that above pigment, a dispersant, resin particles and water are dispersed in a ball mill or the like.

Examples of the water-soluble dye usable as a colorant include, but are not limited to, direct dyes and acid dyes. Specific examples include C. I. direct black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199; C. I. direct violet 7, 9, 47, 48, 51, 66, 90, 93, 94, 95, 98, 100 and 101; C. I. direct yellow 8, 9, 11, 12, 27, 28, 29, 33, 35, 39, 41,. 44, 50, 53, 58, 59, 68, 86, 87, 93, 95, 96, 98, 100, 106, 108, 109, 110, 130, 132, 144, 161 and 163; C. I. direct blue 1, 10, 15, 22, 25, 55, 67, 68, 71, 76, 77, 78, 80, 84, 86, 87, 90, 98, 106, 201, 202, 244, 251 and 280; C. I. acid black 7, 24, 29 and 48; C. I. acid violet 5, 34, 43, 47, 48, 90 and 103; C. I. acid yellow 17, 19, 23, 25, 39, 40, 44, 49, 50, 61, 110, 174 and 218; C. I. acid blue 9, 25, 40, 41, 62, 72, 76, 80, 106, 112, 120, 205, 230, 271 and 280 and the like. The amount of the above-exemplified dye is determined depending on the kind of the dye, kind of the solvent component, properties required for the ink composition or the like. It is generally added in an effective amount, preferably 0.2 wt. % to 10 wt. %, and preferably 0.5 wt. % to 5 wt. %, on the basis of the entire amount of the ink composition.

In addition, the ink composition of the present invention can contain such additives as a pH controlling agents including potassium dihydrogen phosphate and sodium dihydrogen phosphate, and an anti-mold, anti-septic, anti-rust agents including benzoic acid, dichlorophene, hexachlorophene, and sorbic acid.

The ink composition of the present invention may also include ethylene glycol, glycerin or a polyvalent alcohol in order to prevent the clogging of the nozzle.

The ink composition can be prepared by the following procedure, but the procedure is not limited thereto. An aqueous dispersion containing a colorant and a dispersant is dispersed in a ball mill. After confirming by a microscopy that the colorant particles are monodispersed in the dispersion, resin particles dispersed in water is added to the dispersion and the mixture is stirred to obtain an uniform dispersion. Then, additives such as an anti-septic agent are added to the resulting dispersion. After confirming that the additives are completely dissolved in the dispersion, the dispersion is filtered through, for example, a membrane filter having a pore size of 10 μm to remove dusts and coarse particles, whereby the ink composition of the present invention can be obtained.

The ink composition according to the present invention can solve the problem of blotting of the ink on the recording paper and can also provide an image which has a markedly high image density and which has water resistance. Moreover, an image obtained by the ink composition of the present invention becomes sticky even at a high environmental temperature and is free from a problem with respect to safety. Accordingly, the ink composition of the present invention and the image recording method using the composition are suited particularly for an ink jet printer.

The constitution and advantages of the present invention will hereinafter be described more specifically by the following examples.

EXAMPLE 1

An ink composition composed of an aqueous dispersion of a copper phthalocyanine pigment as a colorant and an aqueous dispersion of acrylic silicone resin particles which had been prepared by emulsion polymerization of an acrylic monomer containing a hydrolyzable methoxysilyl group was prepared as follows:

Aqueous dispersion of a copper phthalocyanine pigment (solid content: 35%) : 9 parts by weight Aqueous dispersion of acrylic silicone resin particles (solid content: 35%, weight-average molecular weight of the resin: 15,000, particle size: 0.1–0.2 micron, a ratio of total moles of the methoxysilyl group to total moles of the acrylic monomer: 0.9) ("Sunmole SW-131", available from Sanyo Chemicals): 104 parts by weight Pigment (colorant) concentration : weight of pigment×100 /(total weight of pigment+resin)=8 wt. %

The ink composition thus prepared was applied on plain paper for copying machine by using a bar coater and dried at a room temperature to obtain a solid image formed of a dry coat film. A plurality of solid images different in the film thickness of the dry coat film (thickness of the image) were obtained by changing the kind of the coating bar (roughness of coated surface) of the bar coater. The optical density of the image measured from the obverse side of the recording paper (on which the image was formed) was 1.5 at the image thickness of 2 $\mu$m and 2.0 (a value corresponding to the ordinary printing) at the image thickness of 4 $\mu$m.

The optical density of the image measured from the reverse side of the paper (the side opposite to the side on which the image was formed) was 0.14 which was almost similar to the optical density of the plain paper on which no image was formed. Accordingly, it was confirmed that the ink composition did not penetrate into the paper.

When the longitudinal cross-sectional view of the solid image on the plain paper was observed by an optical microscope, it was confirmed that the image was formed just on the plain paper and that the ink composition did not penetrate into the paper.

By using a commercially-available ink jet printer, the ink composition was printed on the plain paper. Before printing, the ink composition was diluted to adjust its viscosity so that the ink composition could be discharged from the ink jet printer. By observing with a magnifier and an optical microscope, it was found that a vivid dot which did not blot at its periphery and had a high image density was formed.

Water was then intentionally dropped onto the solid image formed by the bar coater and the image portion of the printed sample formed by a printer to evaluate water resistance of these solid image and printed sample. As a result, it was found that even by the addition of water, blotting of image was not recognized and that the ink composition according to the present invention had high water resistance.

In order to evaluate the stickiness of the image portion of the printed sample at a high crosslinking temperature, two sheets of the printed samples were stacked one after another, with the obverse of one example sheet being contiguous to the reverse of the other example sheet, and heated while applied a load of 10 g/cm$^2$, and the temperature at which the obverse of one example adhered to the reverse of the other, that is, a blocking temperature was determined. As a result, it was found that the blocking temperature was 60° C.

EXAMPLE 2

An ink composition composed of an aqueous solution of a phthalocyanine dye (acid blue 9) as a colorant and an aqueous dispersion of acrylic silicone resin particles which had been prepared by emulsion polymerization of an acrylic monomer containing a hydrolyzable methoxysilyl group was prepared as follows:

Aqueous solution of phthalocyanine dye [acid blue 9] (solid content: 10%) : 30 parts by weight Aqueous dispersion of acrylic silicone resin particles (solid content: 35%, similar dispersion to those employed in Example 1): 99 parts by weight Dye (colorant) concentration: weight of dye×100/(total weight of dye+resin)=8 wt. %

The ink composition thus prepared was applied on plain paper for copying machine by using a bar coater, and dried at a room temperature to obtain a solid image formed of a dry coat film. A plurality of solid images different in the image thickness were obtained by changing the kind of the coating bar of the bar coater. The optical density of the image measured from the obverse side was 1.8 at the image thickness of 3.3 $\mu$m and 2.0 at the image thickness of 6 $\mu$m.

The optical density of the image measured from the reverse side of the paper was 0.14. Accordingly, it was confirmed that even when a dye which was more likely to penetrate into the paper than a pigment was used, the resulting ink composition hardly penetrated into the paper.

When the longitudinal cross-section of the solid image on the plain paper was observed by an optical microscope, it was confirmed that the image was formed on the paper and that the ink composition did not penetrate into the paper.

By using a commercially-available ink jet printer, the ink composition was printed on the plain paper. Before printing, the ink composition was diluted to adjust its viscosity so that the ink could be discharged from the ink jet printer. By observing with a magnifier and an optical microscope, it was found that a vivid dot which did not blot at its periphery and had a high image density was formed.

Water was then intentionally dropped onto the solid image formed by the bar coater and the image portion of the printed sample formed by a printer to evaluate water resistance of these solid image and the printed sample. As a result, it was found that even by the addition of water, blotting of the image was not recognized and that the ink composition according to the present invention had high water resistance.

The blocking temperature at the image portion of the printed sample was thereafter measured as in Example 1. As a result, it was found that the blocking temperature was 55° C.

Control 1

An ink composition was prepared by mixing as a colorant an aqueous solution of a phthalocyanine dye [acid blue 9] and purified water (distilled water). The concentration of the dye was 10 wt. %. To avoid aggregation of the dye on the plain paper at the time of coating, a surface active agent was added to the ink composition so that its concentration was 0.2 wt. %.

As in Example 1 or Example 2, the ink composition thus prepared was applied on plain paper for copying machine by using a bar coater, and dried at a room temperature to obtain a solid image. A plurality of solid images different in the film thickness at the time of coating (that is, the thickness of wet film containing water) were obtained by changing the kind of the coating bar of the bar coater. The optical density of the image measured from the obverse side was as low as 1.4 at the film thickness at the time of coating (wet film thickness) of 11.4 μm and it remained as low as 1.4 even at the film thickness at the time of coating (wet film thickness) of 21 μm.

As a result of visual observing, from the reverse side of the paper, the image recorded on the plain paper, it was confirmed that the color of the colorant influenced on that of the reverse eminently and that the ink composition penetrated markedly into the paper. The optical density of the image measured from the reverse side of the paper was 1.0 when the film thickness at the time of coating (wet film thickness) was 11.4 μm (the image thickness at the time of measuring was much smaller than that at the time of coating because of the penetration of the image into the paper) and 1.1 when the film thickness at the time of coating (wet film thickness) was 21 μm. The optical densities were almost similar both in the obverse and reverse of the plain paper. From the result, an eminent penetration of the ink composition into the paper was confirmed.

Moreover, the longitudinal cross-section of the solid image on the paper was observed by an optical microscope. Then, it was found that the image was formed not only on the surface of the paper but also in the paper. It was therefore confirmed that the ink composition penetrated into the paper.

Next, by using a commercially-available ink jet printer similar to that employed in Example 1 and Example 2, the ink composition was printed on plain paper. When the printed dot of the printed sample thus printed was observed by a magnifier and an optical microscope, it was confirmed that the ink blotted markedly at the periphery of the dot and that an unclear dot having a low image density was formed. Then water was intentionally dropped onto the solid image formed by the bar coater and the image portion of the printed sample formed by a printer to evaluate water resistance of these solid image and printed sample. As a result, blotting of the image owing to water was recognized and it was found that the ink composition had low water resistance.

Control 2

In a similar manner to Example 1 except that uncrosslinked polyester resin particles (solid content: 30%, particle size: 0.1–0.2 micron) were used instead of the acrylic silicone resin particles, a solid image having a pigment concentration of 8 wt. % was formed. The optical density of the image at the image thickness of 2 μm was 1.4 and that at the image thickness of 4 μm was as high as 1.9. As in Example 1, the optical density of the reverse of the plain paper having a solid image on the obverse was measured, the transverse cross-section of the solid image was observed by an optical microscope and printed dot was observed by an optical microscope. As a result, it was confirmed that there occurred neither penetration of the ink composition in the plain paper nor the blotting at the periphery of the dot. In addition, water resistance of the solid image was evaluated as in Example 1. As a result, blotting of the image was not recognized and it was found that the solid image obtained had high water resistance. In order to evaluate the stickiness of the image portion of the printed sample at a high environmental temperature, two sheets of the printed samples were stacked each other, with the obverse of one sample sheet being contiguous to the reverse of the other sample sheet, followed by heating while applied a load of 10 g/cm$^2$ to determine a blocking temperature. As a result, the blocking temperature was 40° C.

Control 3

In a similar manner to Example 2 except that uncrosslinked polyester resin particles (solid content: 30%, particle size: 0.1–0.2 micron) were used instead of the acrylic silicone resin particles, a solid image having a pigment concentration of 8 wt. % was formed. The optical density of the image at the image thickness of 3.3 μm was 1.6 and that at the image thickness of 6 μm was as high as 2.0. As in Example 2, the optical density of the reverse of the paper having a solid image on the obverse was measured, the transverse cross-section of the solid image was observed by an optical microscope and printed dot was observed by an optical microscope. As a result, it was confirmed that there occurred neither penetration of the ink composition in the paper nor blotting around the dot. In addition, water resistance of the solid image was evaluated as in Example 2. As a result, blotting of the image due to water was recognized and it was found that the solid image obtained had high water resistance. In order to evaluate the stickiness of the image portion of the printed sample at a high environmental temperature, two sheets of the printed samples were stacked each other, with the obverse of one sample sheet being contiguous to the reverse of the other sample sheet, followed by heating while applyied a load of 10 g/cm$^2$ to determine the blocking temperature. As a result, the blocking temperature was 40° C.

What is claimed is:

1. An ink composition comprising water, a colorant and from 1 wt. % to 50 wt. % of acrylic silicone resin particles having alkoxysilyl groups, wherein the alkoxy group of said alkoxysilyl group has 1–3 carbon atoms and said acrylic silicone resin has a weight-average molecular weight of from 2,000 to 100,000.

2. An ink composition according to claim 1, wherein the alkoxyl group of said alkoxysilyl group is a methoxy or ethoxy group.

3. An ink composition according to claim 1, wherein the average particle size of said particles is from 0.01 μm to 3 μm.

4. An ink composition according to claim 3, wherein said colorant is a pigment and the content of said pigment is from 1 wt. % to 30 wt. %.

5. An ink composition according to claim 3, wherein said colorant is a dye and the content of said dye is from 0.2 wt. % to 10 wt. %.

6. An ink composition according to claim 1, wherein said colorant is a pigment.

7. An ink composition according to claim 6, wherein the content of said pigment is from 1 wt. % to 30 wt. %.

8. An ink composition according to claim 1, wherein said colorant is a water-soluble dye.

9. An ink composition according to claim 8, wherein the content of said water-soluble dye is from 0.2 wt. % to 10 wt. %.

10. An ink composition which comprises water, a colorant and acrylic silicone resin particles having a $C_{1-3}$ alkoxysilyl group, the content of said particles being from 1 wt. % to 50 wt. %, wherein said acrylic silicone resin has a weight-average molecular weight of from 2,000 to 100,000.

11. An ink composition according to claim 10, wherein the average particle size of said particles is from 0.01 μm to 3 μm.

12. An ink composition according to claim 10, wherein said colorant is a pigment.

13. An ink composition according to claim 10, wherein said colorant is a water-soluble dye.

14. An ink composition according to claim 10, wherein said colorant is a pigment and the content of said pigment is from 1 wt. % to 30 wt. %.

15. An in composition according to claim 10, wherein said colorant is a water-soluble dye and the content of said dye is from 0.2 wt. % to 10 wt. %.

16. An ink composition comprising water, a colorant and from 1 wt. % to 50 wt. % of acrylic silicone resin particles having an alkoxysilyl group, wherein said alkoxysilyl group is represented by formula —Si(OR)$_3$ where R represents a C$_{1-3}$ alkyl group and wherein said acrylic silicone resin has a weight-average molecular weight of from 2,000 to 100,000.

17. An ink composition according to claim 16, wherein the average particle size of said particles is from 0.01 μm to 3 μm.

18. An image recording method comprising discharging the droplet of an ink composition from a recording head to record an image on a substrate, said ink composition comprising water, a colorant and from 1 wt. % to 50 wt. % of acrylic silicone resin particles having alkoxysilyl groups, wherein the alkoxy group of said alkoxysilyl group has 1–3 carbon atoms and said acrylic silicone resin has a weight-average molecular weight of from 2,000 to 100.000.

19. An image recording method according to claim 18, wherein said substrate is plain paper.

20. An image recording method according to claim 18, wherein the average particle size of said particles is from 0.01 μm to 3 μm.

21. An image recording method according to claim 5, wherein said colorant is a pigment and the content of said pigment is from 1 wt. % to 30 wt. %.

22. An image recording method according to claim 5, wherein said colorant is a dye and the content of said dye is from 0.2 wt. % to 10 wt. %.

* * * * *